United States Patent
Bower et al.

(10) Patent No.: US 10,184,528 B2
(45) Date of Patent: Jan. 22, 2019

(54) COUPLING, DRIVE ASSEMBLY AND ASSOCIATED METHOD

(71) Applicant: Regal Beloit America, Inc., Beloit, WI (US)

(72) Inventors: Nicholas Chase Bower, Janesville, WI (US); Zachary Alan Bower, Janesville, WI (US)

(*) Notice: Subject to any disclaimer, the term of this patent is extended or adjusted under 35 U.S.C. 154(b) by 0 days.

(21) Appl. No.: 14/820,804

(22) Filed: Aug. 7, 2015

(65) Prior Publication Data

US 2017/0037912 A1    Feb. 9, 2017

(51) Int. Cl.
| F16D 11/14 | (2006.01) |
| F16D 25/061 | (2006.01) |
| F16D 25/08 | (2006.01) |
| F16D 11/00 | (2006.01) |

(52) U.S. Cl.
CPC ............ F16D 25/082 (2013.01); F16D 11/14 (2013.01); F16D 25/061 (2013.01); *F16D 2011/002* (2013.01)

(58) Field of Classification Search
CPC .... F16D 2011/002; F16D 11/10; F16D 11/14; F16D 25/082; F16D 25/083; F16D 25/061; F04B 9/02; F04D 13/021; F04D 25/02
USPC ........................ 192/69.9, 69.91, 85.48, 85.49
See application file for complete search history.

(56) References Cited

U.S. PATENT DOCUMENTS

| 2,320,613 A | 6/1943 | Saak |
| 2,541,197 A | 2/1951 | Breedlove |
| 2,698,584 A | 1/1955 | Stelzer |
| 3,074,233 A | 1/1963 | Keech |
| 3,391,536 A | 7/1968 | Ashton |
| 3,514,017 A | 5/1970 | Malone |
| 3,566,746 A | 3/1971 | Harrison |
| 3,808,814 A | 5/1974 | Macy, II |
| 3,872,955 A * | 3/1975 | McIntyre ................ F16D 23/12 192/69.9 |
| 4,201,053 A | 5/1980 | Atkey |
| 4,345,883 A | 8/1982 | Westerlund et al. |
| 4,492,536 A | 1/1985 | Gilbertson |
| 4,493,189 A | 1/1985 | Slater |
| 4,600,366 A | 7/1986 | Stenner |
| 4,684,062 A | 8/1987 | Bagwell |
| 4,740,142 A | 4/1988 | Rohs et al. |
| 4,909,371 A | 3/1990 | Okamoto et al. |
| 5,044,481 A * | 9/1991 | Yoshida .................. B30B 15/12 192/69.91 |

(Continued)

*Primary Examiner* — Richard M Lorence
(74) *Attorney, Agent, or Firm* — John Wagley

(57) ABSTRACT

According to an embodiment of the invention, a drive coupling for connecting to a drive is provided. The drive coupling is adapted to removably couple a load to a power source. The drive coupling includes a body and a plurality of components. The components are operably interconnected with each other. The components have a first arrangement in which the components transmit torque from the power source to the load and a second arrangement in which the components transmit no significant torque from the power source to the load. A first of the plurality of components is adapted to translate along its center of rotation relative to a second of the plurality of components from a first position in which the components define the first arrangement to a second position in which the components define the second arrangement.

16 Claims, 12 Drawing Sheets

(56) References Cited

U.S. PATENT DOCUMENTS

| | | | |
|---|---|---|---|
| 5,386,898 A * | 2/1995 | Weilant | B60K 23/08 |
| | | | 180/247 |
| 5,421,520 A | 6/1995 | Simonette et al. | |
| 5,531,072 A | 7/1996 | Larkin | |
| 5,560,520 A | 10/1996 | Grogen | |
| 5,603,389 A * | 2/1997 | Zemon | A62B 35/0068 |
| | | | 116/174 |
| 5,813,315 A | 9/1998 | Kristensen et al. | |
| 6,000,316 A | 12/1999 | Moller et al. | |
| 6,073,502 A * | 6/2000 | Wallace | B60K 17/28 |
| | | | 192/69.9 |
| 6,113,359 A | 9/2000 | Watts et al. | |
| 7,107,767 B2 | 9/2006 | Frazer et al. | |
| 7,290,987 B1 | 11/2007 | Morin | |
| 2004/0204282 A1* | 10/2004 | Green | B60K 17/16 |
| | | | 475/231 |

* cited by examiner

COUPLING, DRIVE ASSEMBLY AND ASSOCIATED METHOD

BACKGROUND OF THE INVENTION

The embodiments described herein relate generally to mechanical drives, and more specifically, to a coupling for a mechanical drive.

Mechanical drives are used extensively commercially to drive or transmit torque to mechanical components. Typically the components are rotationally driven. The mechanical drives are typically adapted for use with a power input, typically in the form of an internal combustion engine or an electric motor. The mechanical drives are used to either increase or decrease the speed of the motor and may also be used to change the orientation and/or direction of the drive, typically raising or lowering and/or changing its angular direction.

One common type of mechanical component for which such mechanical drives are used is pumps. Pumps are used to propel fluid in the form of, for example, liquids or gasses.

A connection of the power input to the mechanical drive and/or a connection of the mechanical drive to the mechanical component are typically made with a device called a coupling.

While the connection of the power input to the mechanical drive and/or the connection of the mechanical drive to the mechanical component may be fixed or permanent, in some applications a dis-connectable coupling arrangement, commonly known as a disconnect coupling, may be desirable. Reasons or needs for disconnect couplings may include a need to service any of the power input, the mechanical component or the mechanical drive. Another reason to use disconnect couplings is to provide for an unloaded start of the power input, particularly to cold start an internal combustion engine in a cold temperature environment. Another reason to use disconnect couplings is that for applications when one power source is used to power multiple loads, not all loads may be required simultaneously. The disconnect couplings can remove an unused load from the power source during periods of disuse saving energy and wear to that load.

Disconnect couplings in pump applications are typically in the form of a clutch. Clutches typically have clutch plates that are moved from a non-engaged arrangement to an engaged arrangement and back. These clutches are expensive to procure, are expensive to maintain and provide for mechanical losses in the drivetrain.

The present invention is directed to alleviate at least some of these problems with the prior art.

BRIEF DESCRIPTION OF THE INVENTION

According to an embodiment of the invention, A drive coupling connected to a drive is provided. The drive coupling is adapted to removably couple a load to a power source. The drive coupling includes a body and a plurality of components. The components are operably interconnected with each other. The components have a first arrangement in which the components transmit torque from the power source to the load and a second arrangement in which the components transmit no significant torque from the power source to the load. A first of the plurality of components is adapted to translate along its center of rotation relative to a second of the plurality of components from a first position in which the components define the first arrangement to a second position in which the components define the second arrangement.

According to an aspect of the invention, the drive coupling may be configured wherein at least one of the body and the plurality of components is adapted to be positioned between the power source and the drive.

According to another aspect of the invention, the drive coupling may be configured wherein at least one of the body and plurality of components is adapted to be positioned between the drive and the load.

According to yet another aspect of the invention, the load may be in the form of a pump. For example, the load may be a pneumatic or hydraulic pump.

According to yet another aspect of the invention, the drive coupling may be configured wherein one of the plurality of components includes a shaft and wherein another of the plurality of components defines a center passage there through, the center passage adapted for receiving the shaft.

According to yet another aspect of the invention, the drive coupling may be configured wherein the component defining a center passage translates along its center of rotation.

According to yet another aspect of the invention, the drive coupling may be configured wherein the component defining a center passage defines protrusions on a periphery thereof and wherein the shaft defines protrusions on a periphery thereof. The protrusions of the component define a center passage and the protrusions of the shaft selectively engage and disengage with each other as the component defining a center passage translates along its center of rotation.

According to yet another aspect of the invention, the drive coupling may be configured wherein the shaft further defines a journal positioned at a first end thereof. The journal defines a hearing surface for cooperating with the drive.

According to yet another aspect of the invention, the drive coupling may further include a biasing device adapted to urge the first of the plurality of components along its center of rotation relative to the second of the plurality of components to one of the first position and the second position.

According to yet another aspect of the invention, the drive coupling may be configured wherein the biasing device urges the first of the plurality of components to the second position.

According to yet another aspect of the invention, the drive coupling may further include a first biasing device adapted to urge the first of the plurality of components along its center of rotation relative to the second of the plurality of components to one of the second position and a second biasing device adapted to selectively urge the first of the plurality of components along its center of rotation relative to the second of the plurality of components to the first position.

According to yet another aspect of the invention, the drive coupling may be configured wherein the first biasing device includes a spring and wherein the second biasing device includes a fluid actuated piston.

According to another embodiment of the invention, a drive assembly may be provided. The drive assembly is adapted to removably couple a pump to a power source. The drive assembly includes a drive including a housing supporting an input member and an output member. The drive assembly also includes a coupling operably connected to the drive. The coupling includes a body and a plurality of components. The components are operably interconnected with each other. The components define a first arrangement in which the components transmit torque from the power source to the pump and a second arrangement in which the components transmit no significant torque from the power source to the pump. A first of the plurality of components is adapted to translate along its center of rotation relative to a second of the plurality of components from a first position in which the components define the first arrangement to a second position in which the components define the second arrangement.

According to an aspect of the invention, the drive assembly may be configured wherein the input member is operably connected to one of the plurality of components.

According to another aspect of the invention, the drive assembly may be configured wherein the output member is operably connected to one of the plurality of components.

According to yet another aspect of the invention, the drive assembly may be configured wherein one of the plurality of components includes a shaft and another of the plurality of components defines a center passage there through. The center passage is adapted for receiving the shaft. The component defining a center passage translates along its center of rotation.

According to yet another aspect of the invention, the drive assembly may be configured wherein the component defining a center passage defines protrusions on a periphery thereof and wherein the shaft defines protrusions on a periphery thereof. The protrusions of the component defining a center passage and the protrusions of the shaft selectively engage and disengage with each other as the component defining a center passage translates along its center of rotation.

According to yet another aspect of the invention, the drive assembly may be configured wherein the shaft further defines a journal positioned at a first end thereof. The journal defines a bearing surface for cooperating with one of the input member and the output member.

According to yet another aspect of the invention, the drive assembly may further include a first biasing device adapted to urge the first of the plurality of components along its center of rotation relative to the second of the plurality of components to one of the second position and a second biasing device adapted to selectively urge the first of the plurality of components along its center of rotation relative to the second of the plurality of components to the first position.

According to yet another aspect of the invention, the drive coupling may be configured wherein the first biasing device includes a spring and wherein the second biasing device includes a fluid actuated piston.

According to another embodiment of the invention, a method for selective engaging and disengaging a pump from a power source is provided. The method includes the steps of operably connecting a power source to a first shaft having an engaging feature, operably connecting the pump to a second shaft having an engaging feature, aligning the rotational centerline of the first shaft to the rotational centerline of the second shaft, providing a sleeve with a first engaging feature for engaging the first shaft and with a second engaging feature for engaging the second shaft, providing the sleeve with sliding cooperation over at least a portion of the first shaft and with sliding cooperation over at least a portion of the second shaft, and at least one of selectively engaging the first engaging feature with the engaging feature of the first shaft and selectively engaging the second engaging feature with the engaging feature of the second shaft to selectively provide a first arrangement in which the first shaft and the second shaft transmit torque from the power source to the pump and a second arrangement in which the first shaft and the second shaft transmit no significant torque from the power source to the pump.

DETAILED DESCRIPTION OF THE INVENTION

Mechanical drives are used extensively commercially to drive or transmit torque to mechanical components. Typically the components are rotationally driven. The mechanical drives are typically adapted for use with a power input, typically in the form of an internal combustion engine or an electric motor. The mechanical drives are used to either increase or decrease the speed of the motor and may also be used to change the orientation and/or direction of the drive, typically raising or lowering and/or changing its angular direction.

One common type of mechanical component for which such mechanical drives are used is pumps. Pumps are used to propel fluid in the form of, for example, liquids or gasses. A connection of the power input to the mechanical drive and/or a connection of the mechanical drive to the mechanical component is typically made with a device called a coupling.

While the connection of the power input to the mechanical drive and/or the connection of the mechanical drive to the mechanical component may be fixed or permanent, in some applications a dis-connectable coupling arrangement, commonly known as a disconnect coupling, may be desirable. Reasons or needs for disconnect couplings may include a need to service any of the power input, the mechanical component or the mechanical drive. Another reason to use disconnect couplings is to provide for an unloaded start of the power input, particularly to cold start an internal combustion engine in a cold temperature environment.

Another reason to use disconnect couplings is that for applications when one power source is used to power multiple loads, not all loads may be required simultaneously. The disconnect couplings can remove an unused load from the power source during periods of disuse saving energy and wear to that load.

Figure 1:
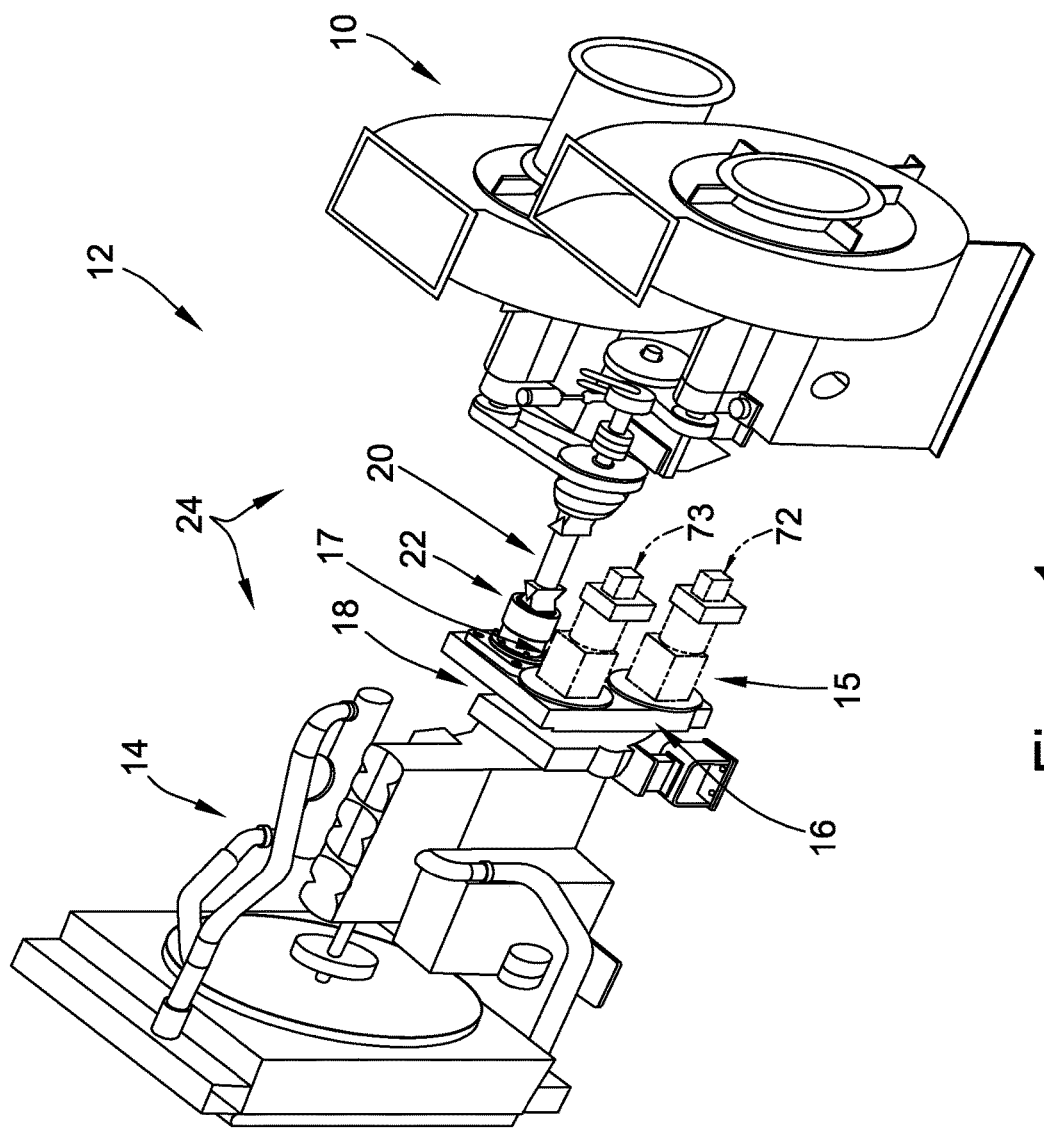
FIG. 1 is a perspective view of an embodiment of the present invention in the form of a pump assembly.

Referring now to FIG. 1, a load 10 is shown installed in a pump installation or device 12. The device 12 may be any device for driving a load 10. The load 10 is a primary load and the primary load may be, for example, a pump to pump a fluid. Alternatively the device 12 may drive any load. For example the device 12 may be a construction machine (for example, a crane, an agricultural sprayer, a wood chopper, an asphalt paver) or a locomotive and the load 10 may be the load associated with such a machine. For example, the load 10 may be hydraulic pump to provide hydrostatic power to a vehicle or an air pump to provide air flow for a Heating, Ventilation, Air Conditioning, or Refrigeration (HVACR) application or for industrial application, such as to clear railroad tracks.

As shown in FIG. 1, the device 12 includes a power source 14. The power source 14 may be any device that provides power to drive the load(s) 10, which may be pump(s) or other loads as mentioned above. For example the power source 14 may be an electric motor or an internal combustion engine.

The device 12 further includes drive 16 for connecting the power source 14 to the load 10. The drive 16 includes a primary drive output 70 to drive the primary load 10. It should be appreciate that the device 12 may also include a first auxiliary drive output 72 for driving a first auxiliary load 15 and a second auxiliary drive output 73 for driving a second auxiliary load 17 in addition to primary drive output 70 for driving the primary load 10 which may for example be a pump. The primary drive output 70 transfers the power from the power source 14 to the load 10, for example in the form of a pump. The drive 16 is connected to the power source 14 at pump drive input 18 and to the load 10 via primary drive output 70.

The drive 16 may provide for a change in the orientation of the power output relative to the power input or to change the rotational speed or direction of the power output compared to the power input. The pump drive may provide for a plurality of input power sources or for a plurality of power outputs including, for example, one or more outputs for powering pumps or one or more outputs to provide for auxiliary rotational power for electrical power generation for any auxiliary power needs.

According to an embodiment of the present invention and as shown in FIG. 1, the device 12 includes a disconnect drive coupling 22 that is adapted to removably couple the load 10 to the power source 14. The drive coupling 22 may be positioned anywhere in drive train 24 of the device between the power source 14 and the load 10, for example a pump.

Figure 2:
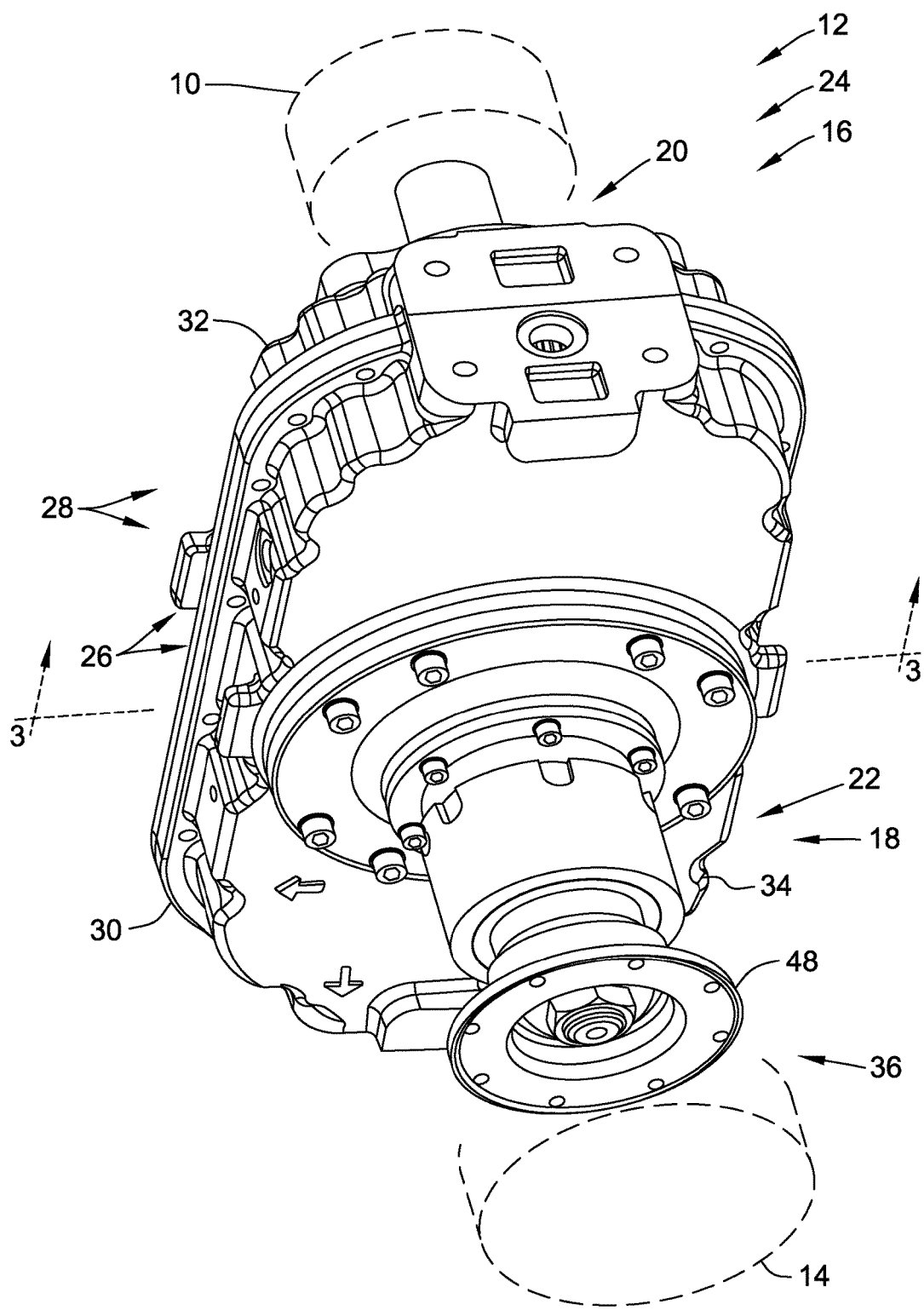
FIG. 2 is a perspective view of an embodiment of the present invention in the form of a drive assembly with a coupling positioned at the input of the drive for use in the pump assembly of FIG. 1.

For example and as shown in FIG. 2, the drive coupling 22 may be positioned at drive input 18 between the drive 16 and the power source 14. Placing the drive coupling 22 at this location would provide for a power disconnect to all outputs. As such the placing of the drive coupling 22 at this location would provide for selective disengaging of the pump drive and permit a cold weather starting of the power source without the load of the pump drive.

As shown in FIG. 2, the pump drive 16 may include a drive housing 26. The drive housing 26 includes drive components 28 that form a portion of the drive train 24. As shown the drive housing 26 may include a housing input drive portion 30 and a housing output drive portion 32. The portions 30 and 32 provide access to the drive components 28.

Figure 3:
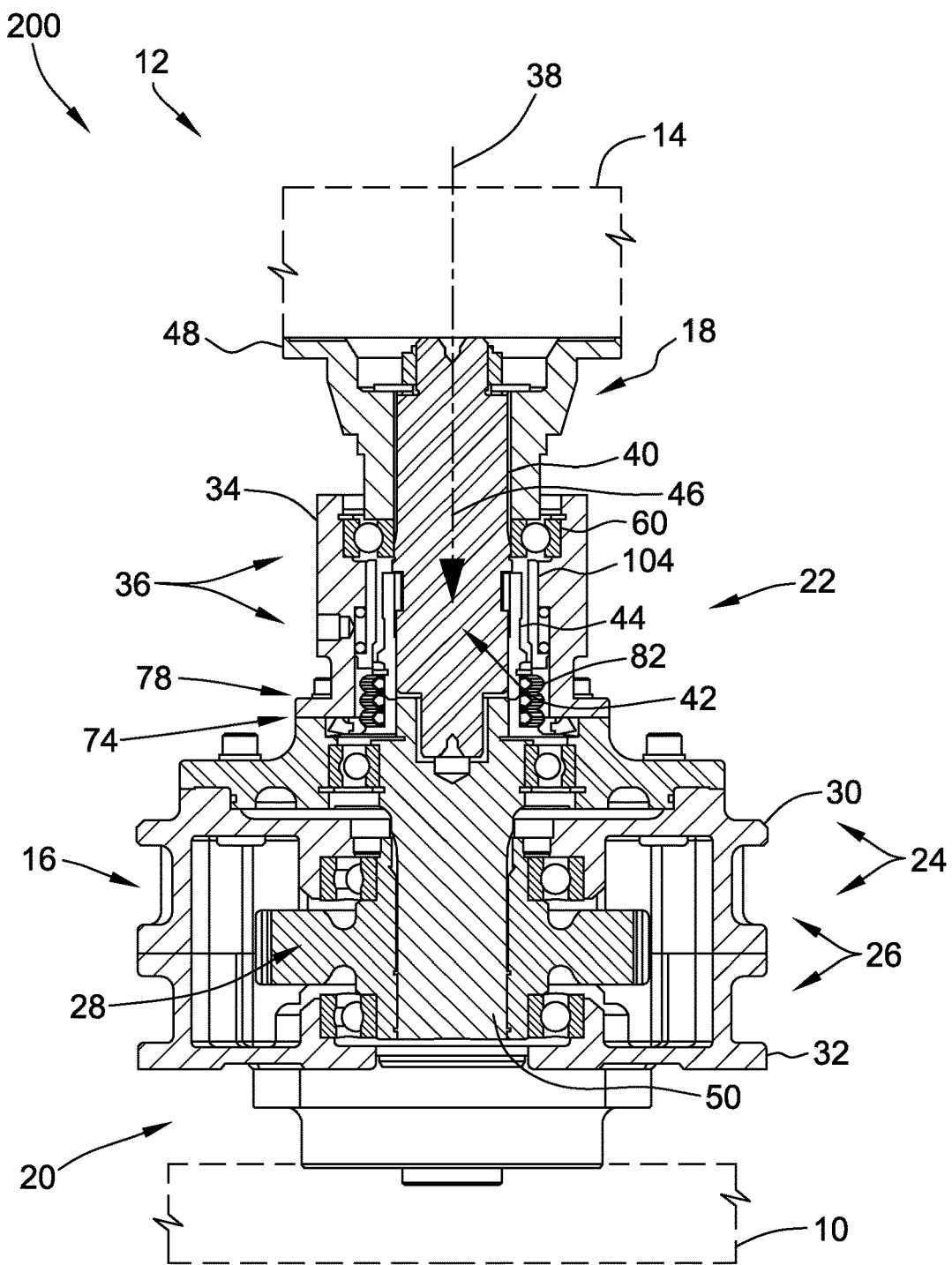
FIG. 3 is a cross sectional view of FIG. 2 along the line 3-3 in the direction of the arrows.

Referring now to FIG. 3, the drive coupling 22 includes a body 34 and a plurality of components 36. The body may be in the form of a housing that is used to contain and support the components 36. At least two of the components 36 are operably interconnected with each other and form a portion of the drive train 24.

While the device 12 may be provided with the drive coupling 22 positioned anywhere along the drive train 24, as shown in FIGS. 2 and 3, coupling 22 is positioned between the power source 14 and the drive 16.

The drive coupling 22 may include any of a number of configurations, provided one of the drive coupling components 36 is adapted to translate along its center of rotation 38 relative to another of the drive coupling components 36 to engage and disengage the drive coupling 22.

For example and as shown in FIG. 3, one of the plurality of components 36 may be in the form of a disconnect shaft 40 and another of the plurality of components 36 may define a center passage 42 through that another of the plurality of components 36. The center passage may be adapted for receiving the disconnect shaft 40.

As shown in FIG. 3, that another of the plurality of components 36 may be in the form of a shift collar 44. The shift collar 44 includes the central passage 42 and receives the disconnect shaft 40. The shift collar 44 is one of the drive coupling components 36 and is adapted to translate along its center of rotation 38 relative to the disconnect shaft 40 which is also one of the drive coupling components 36. The shift collar 44 and the disconnect shaft 40 cooperate to engage and disengage the drive coupling 22.

For example, the shift collar 44 is adapted to move in the direction of arrow 46 to engage with the input shaft 50. As shown, the disconnect shaft 40 in rotatably connected to power source flange 48. The power source flange 48 is rotatably connected to power source 14. As shown, the shift collar 44 is rotatably connected to the drive 16 when the drive coupling 22 is engaged. While the shift collar 44 may be rotatably connected to the drive 16 in any suitable fashion, for example, and as shown in FIG. 3, the drive 16 includes an input shaft 50 to which the shaft collar 44 is rotatably connected.

Figure 5:
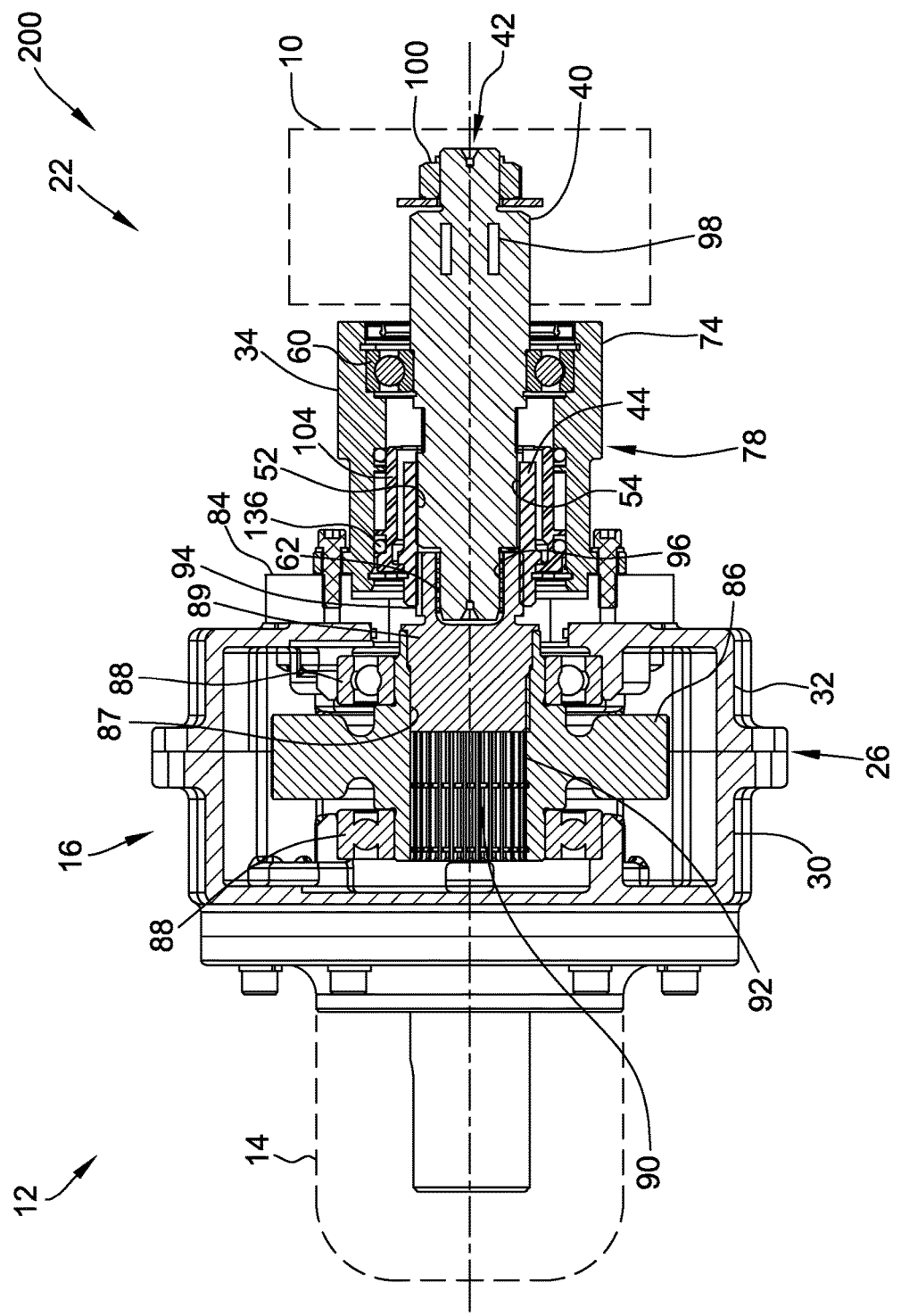
FIG. 5 is a cross sectional view of FIG. 4 along the line 5-5 in the direction of the arrows, showing the coupling assembly in the first arrangement.

The shift collar 44 and the disconnect shaft 40 may be removeably, rotatably cooperate with each other in any suitable manner. For example, the shift collar 44 may include a shaft disconnect feature 52 for cooperation with a collar disconnect feature 54 on the disconnect shaft 40. For example, the shaft disconnect feature 52 may be, as shown in FIG. 5, in the form of protrusions on an internal periphery 56 of the shift collar 44. The internal periphery 56 defines the central passage 42 of the shift collar 44. For example, the protrusions 52 may be in the form an internal spline and may for example be an involute spline.

For example, the collar disconnect feature 54, on the disconnect shaft 40 may be, as shown in FIG. 3, in the form of protrusions on an external periphery 58 of the disconnect shaft 40. For example, the protrusions 54 may be in the form an external spline and may for example be an involute spline. The external spline 54 on the disconnect shaft 40 may be matingly fitted with the internal spline 52 on the shift collar 44. The internal spline 52 on the shift collar 44 and the external spline 54 on the disconnect shaft 40 selectively engage and disengage with each other as the shift collar 44 translates along its center of rotation 38.

The disconnect shaft 40 may be supported in any suitable fashion within the drive coupling 22. For example and as shown in FIG. 3, the disconnect shaft 22 may be rotatably supported within the body or housing 34 of the drive coupling 22 by drive coupling central bearing 60. The disconnect shaft 22 may be further rotatably supported by drive coupling end bearing 62 fitted within bore 64 of input shaft 50 of drive 16. The drive coupling central bearing 60 may be the internal periphery of bore 64 or may be, a shown a separate component, for example a sleeve, for example a sleeve with a Teflon® coating, Teflon® is a registered trademark of E. I. Du Pont De Nemours and Company Corporation, 1007 Market Street, Wilmington, Del. 19898

While, as shown in FIGS. 1-3, the drive coupling 22 may be positioned between the power source 14 and the drive coupling 22, it should be appreciated that the drive coupling 22 may be positioned anywhere in the drive train 24 between the power source 14 and the load 10.

Figure 4:
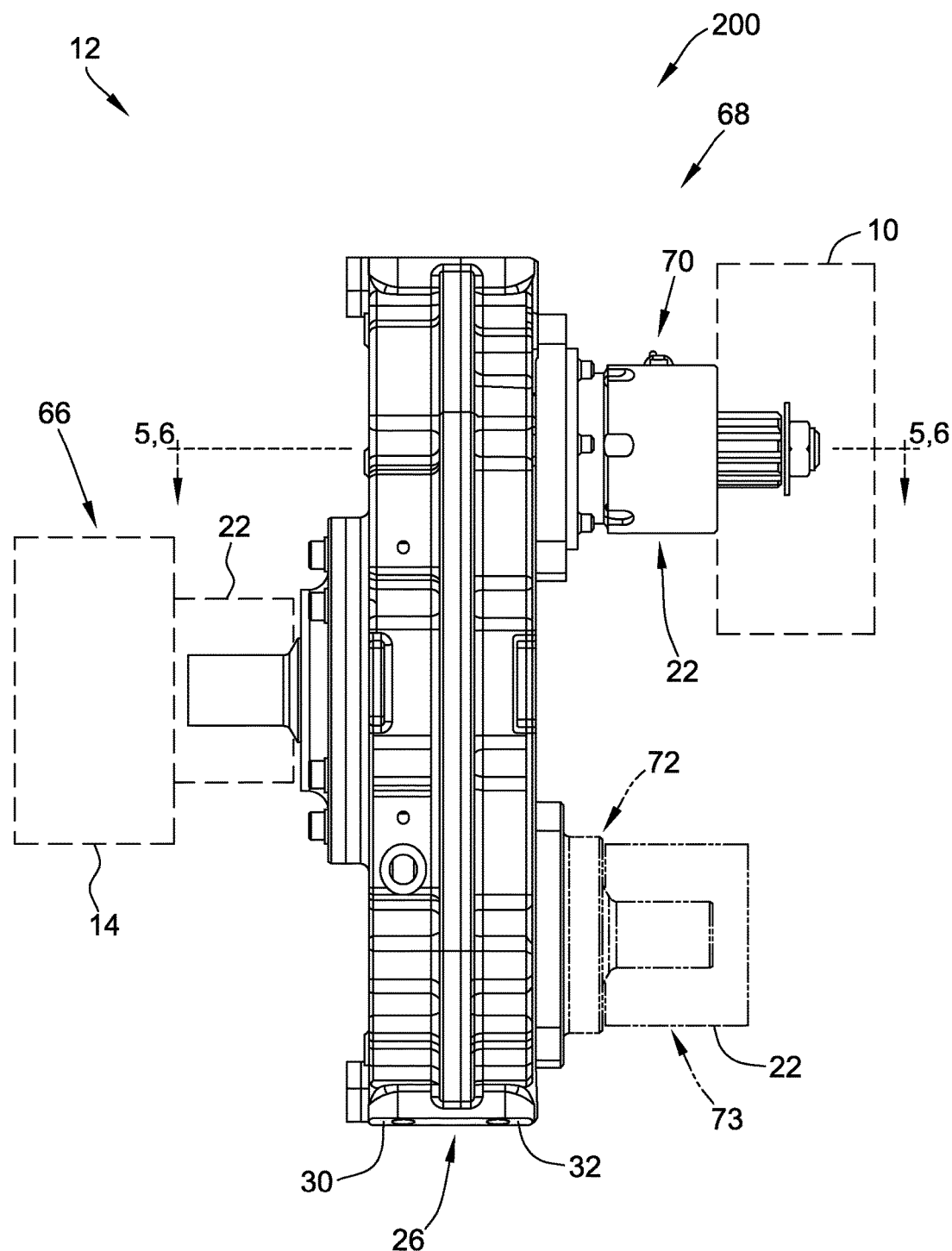
FIG. 4 is a plan view of an embodiment of the present invention in the form of a drive assembly with a coupling assembly positioned at the output of the drive for use in the pump assembly of FIG. 1.

For example, and as shown in FIG. 4, the drive coupling 22, as shown in FIG. 4 may be positioned at drive input 66, see FIGS. 1-3, or at any of drive outputs 68. For example, drive coupling 22, may be positioned as shown in FIG. 4 between the drive 16 and the load 10, for example, at first drive output 70. Alternatively or in addition, the drive coupling 22 may be positioned at drive input 66, as shown in phantom, and/or at second drive output 72, as shown in phantom. While a solitary drive coupling 22 may be used and may be sufficient to provide for a disconnect of the load 10 from the power source 14, it should be appreciated that more than one drive coupling 22 may be used. For example, a drive coupling 22 may be used at both the drive input 66 and at any or all of drive outputs 68.

The drive coupling 22 may, as shown be identical independent of where it is used, either at the drive input 66 or at one of the drive outputs 68. Alternatively, a different drive coupling may be used for the drive input 66 than for the drive outputs 68. The drive input typically is at a higher torque and at a lower speed that the drive output, so corresponding drive coupling design modifications to accommodate these differences may be warranted.

As shown in FIGS. 4-7, the drive coupling 22, may be positioned between the drive 16 and the load 10 or the first auxiliary load (hydraulic pump(s)) 15, for example, at first drive output 70.

Figure 6:
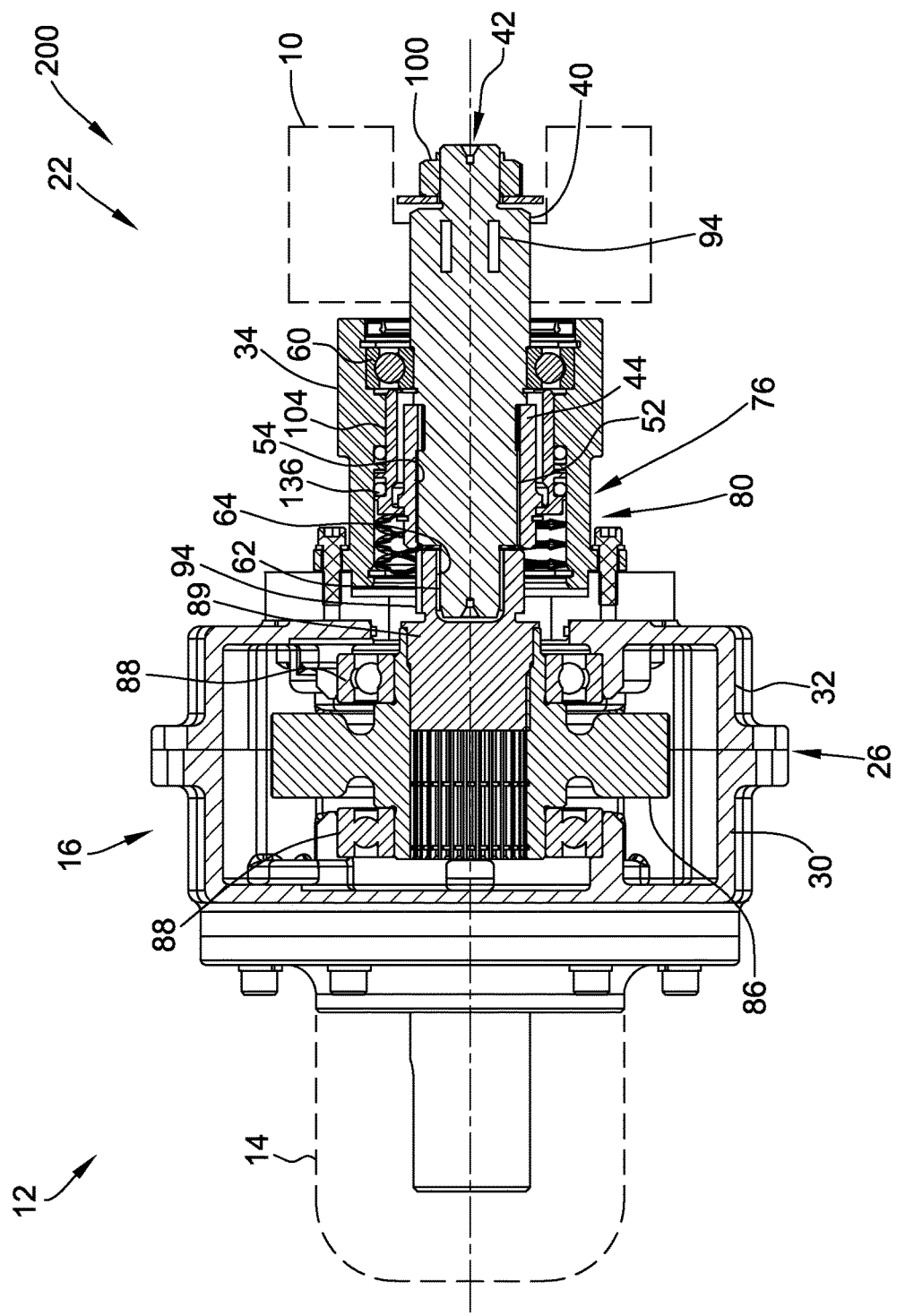
FIG. 6 is a cross sectional view of FIG. 4 along the line 5-5 in the direction of the arrows, showing the coupling assembly in the second arrangement.

Referring now to FIGS. 5 and 6, the drive coupling components 36 may have a first arrangement 74 (see FIG. 5) in which the components transmit torque from the power source to the load 10 and a second arrangement 76 (see FIG. 6) in which the components transmit no significant torque from the power source 14 to the load 10. A first component, for example the shift collar 44, of the drive coupling components 36 may be adapted to translate along its center of rotation 38 relative to a second component, for example the disconnect shaft 40, of the drive coupling components 36 from a first position 78, as shown in FIG. 5, in which the components define the first arrangement 74, to a second position 80, in which the drive coupling components 36 define the second arrangement 76 as shown in FIG. 6.

As shown in FIG. 5, the drive coupling 22 may further include a biasing device 82 adapted to urge the first of the plurality of components 36, for example the shift collar 44, along its center of rotation 38 relative to the second of the plurality of components 36, for example the disconnect shaft 40, to one of the first position 78 and the second position 80.

While the biasing device 82 may urge the shift collar 44 to the first position 78 or to the second position 80, as shown in FIG. 3, the biasing device 82 urges the shift collar 44 in a direction along center of rotation 38 opposed to arrow 46 to place the drive coupling 22 in the second arrangement 76 which is the unengaged position.

The biasing device 82 may be any device capable of urging the shift collar 44. For example the biasing device may be a hydraulic or pneumatic piston, a motor or, as shown, a spring. The spring 82 may be in the form of a wave spring which may be well suited to provide sufficient force to so bias the shift collar 44.

The coupling 22 may be mounted to the drive 16 in any suitable fashion. For example and as shown in FIG. 5, a drive output coupling adaptor 84 may be positioned between the coupling housing 34 and the housing output drive portion 32. The disconnect shaft 40 may, as shown in FIG. 5, be supported by the drive coupling end bearing 62 which may be positioned in bore 87 formed in drive output shaft 89. The drive output gear 86 may be supported within the drive housing 26 by bearings 88.

Torque may be transmitted from the power source 14 to the load 10 by suitable components to form the drive train 24. For example and as shown in FIG. 5, power from the power source 14 is transferred to the drive 16. Within the drive 16, power is transferred from the drive output gear 86 to the drive output shaft 89 continuously whether in the first arrangement 74 or in the second arrangement 76.

For example, the drive output gear 86 may include a torque transfer feature 90 that cooperates with a gear torque transfer feature 92 on the drive output shaft 89. The torque transfer feature 90 of the drive output gear 86 may, for example, be in the form of an internal protrusion, for example in the form of a spline, for example an involute spline. The gear torque transfer feature 92 of the drive output shaft 89 may, for example, be in the form of a external protrusion, for example in the form of a spline, for example an involute spline.

When the shift collar 44 is in the first arrangement 74, as shown in FIG. 5, the collar 44 engages the output shaft 89, thereby transferring torque from the output shaft 89 to the disconnect shaft 40.

Torque from the drive output shaft 89 may be transferred to the shift collar 44 in any suitable fashion. For example and as shown in FIG. 5, the drive output shaft 89 may further include a collar torque transfer feature 94 which cooperates with an output shaft torque transfer feature 96 on the collar 44. The collar torque transfer feature 94 of the drive output shaft 89 may, for example, be in the form of an external protrusion, for example in the form of a spline, for example an involute spline. The output shaft torque transfer feature 96 of the collar 44 may, for example, be in the form of a internal protrusion, for example in the form of a spline, for example an involute spline.

Torque from the collar disconnect feature 54 of the shift collar 44 may be transferred to the shaft disconnect feature 52 of the disconnect shaft 40. Torque from the disconnect shaft 40 may be transferred to the load 10 by way of the driveshaft 20 by pump connect feature 98 on the disconnect shaft 40. The pump connect feature 94 may, for example, be in the form of an external protrusion, for example in the form of a spline, for example an involute spline. A nut 100 may be threadably engaged to the disconnect shaft 40 for securing the load 10 to the shaft 40 by way of the driveshaft 20.

Referring now to FIG. 6, the drive coupling 22 is shown with the drive coupling components 36 in the second position 80, in which the drive coupling components 36 define the second arrangement 76. For example, one of the drive coupling components 36, namely the shift collar 44, is shown disengaged from the disconnect shaft 40.

The disengagement of the shaft 40 from the collar 44 may be accomplished in any suitable way. For example and as shown in FIG. 6, the collar 44 moves to the second position 80 whereby the internal spline 96 of collar 44 is spaced from external spline 94 of the output shaft 89. Similarly, when the collar 44 moves to the second position 80, the internal spline 54 of collar 44 is spaced from external spline 94 of the output shaft 89, providing for the disconnecting of the load 10 from the power source 14.

As shown in FIG. 6, the drive coupling 22 may further include a second biasing device 102 adapted to urge the shift collar 44 to the second position 80 as shown in FIG. 6. The second biasing device 102 may be any device capable of moving the shift collar along center of rotation 38 to the second position 80. For example the second biasing device 102 may be a motor, a spring, or a mechanical mechanism.

For example and as shown in FIGS. 5-9, the second biasing device 102 may be in the form of a fluid apparatus. The fluid may be gas (air/pneumatic) or liquid (oil/hydraulic). The pneumatic or hydraulic apparatus 102 may include a piston or shuttle 104. The shuttle 104 includes first and second cylindrical peripheries 105 and 106 respectively which are matingly fitted to first and second bores 108 and 110 formed in drive coupling housing 34. A ring shaped fluid displacement chamber 112 may be formed and bounded by the first and second bores 108 and 110 and the first and second cylindrical peripheries 105 and 106 and formed by an internal flange 114 in the drive coupling housing 44 and by an external flange 116 formed on the shuttle 104. Pressurized fluid 118 is induced into the chamber 112 through port 120 formed in drive coupling housing 34 between the internal flange 114 in the drive coupling housing 44 and the external flange 116 formed on the shuttle 104. The pressurized fluid 118 urges the shuttle in the direction of arrow 46.

The shuttle 104 may include a feature 124 that cooperates with one of the spring 82 and the collar 44 to urge the collar to the second position 80. As shown, the feature 124 may be in the form of inward extending lip 126 that is fitted between a shoulder 128 formed in a external circumferential ring 130 of the collar 44 and a snap ring 132 fitted into a circumferential groove 134 in the collar 44. The feature 124 both moves the collar 44 and the spring 82 simultaneously.

To improve sealing and maintaining pressure with the displacement chamber 112, O-rings 136 may be positioned in grooves 138 and 140 formed respectively in the shuttle and the drive coupling housing 34.

It should be appreciated that the collar 44 and the shuttle 104 may be combined into a singular component. However, a separate collar 44 and separate shuttle 104 permit the shuttle to only translate along center passage 42 while the collar 44 rotates when in first position 78. This arrangement makes sealing and maintaining pressure with the displacement chamber 112 more simple.

Referring again to FIGS. 3-6, a drive assembly 200 may be provided. The drive assembly is adapted to removably couple load 10 to power source 14. The drive assembly 200 includes drive 16 including drive housing 26 supporting an input member 50 and an output member 89. The drive assembly 200 also includes coupling 22 operably connected to the drive 16. The coupling 22 includes body or housing 34 and a plurality of components 36. The components 36 are operably interconnected with each other. The components 36 define the first arrangement 74 in which the components transmit torque from the power source 14 to the load 10 and the second arrangement 76 in which the components 36 transmit no significant torque from the power source 14 to the load 10. The first 44 of the plurality of components 36 is adapted to translate along its center of rotation 38 relative to the second 40 of the plurality of components 36 from first position 78 in which the components 36 define the first arrangement 74 to a second position 80 in which the components 36 define the second arrangement 78.

Figure 7:
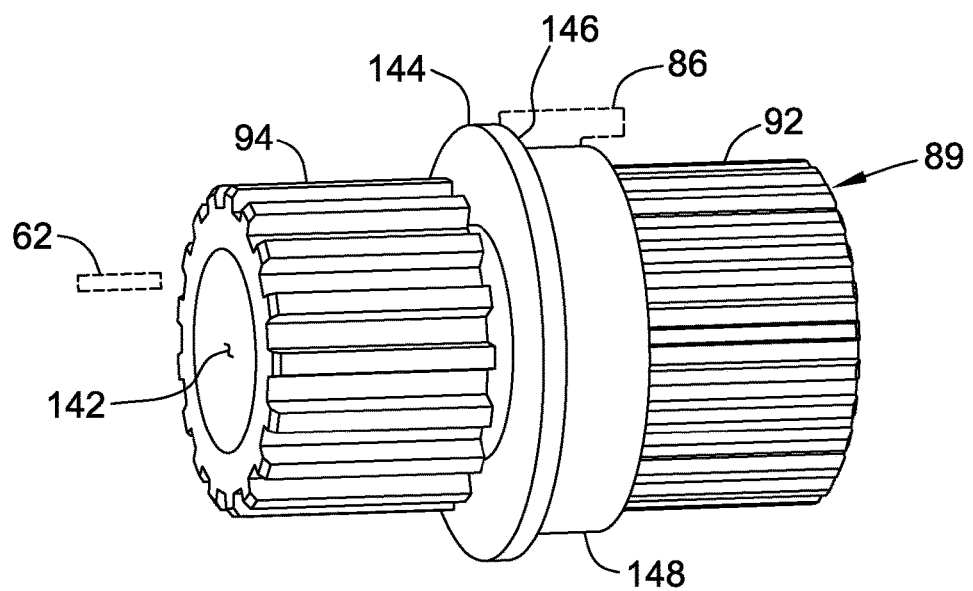
FIG. 7 is a perspective view of the drive output shaft of the coupling assembly of FIG. 5 and FIG. 6.

Referring now to FIG. 7, the drive output shaft 89 is shown in greater detail. The shaft 89 may include a bearing bore 142 for receiving drive coupling end bearing 62 (see FIG. 5). The shaft 89 may also include a flange 144 for providing a radially extending face 146 and a cylinder periphery 148 for mating with the drive output gear 86 (see FIG. 5).

Figure 8:
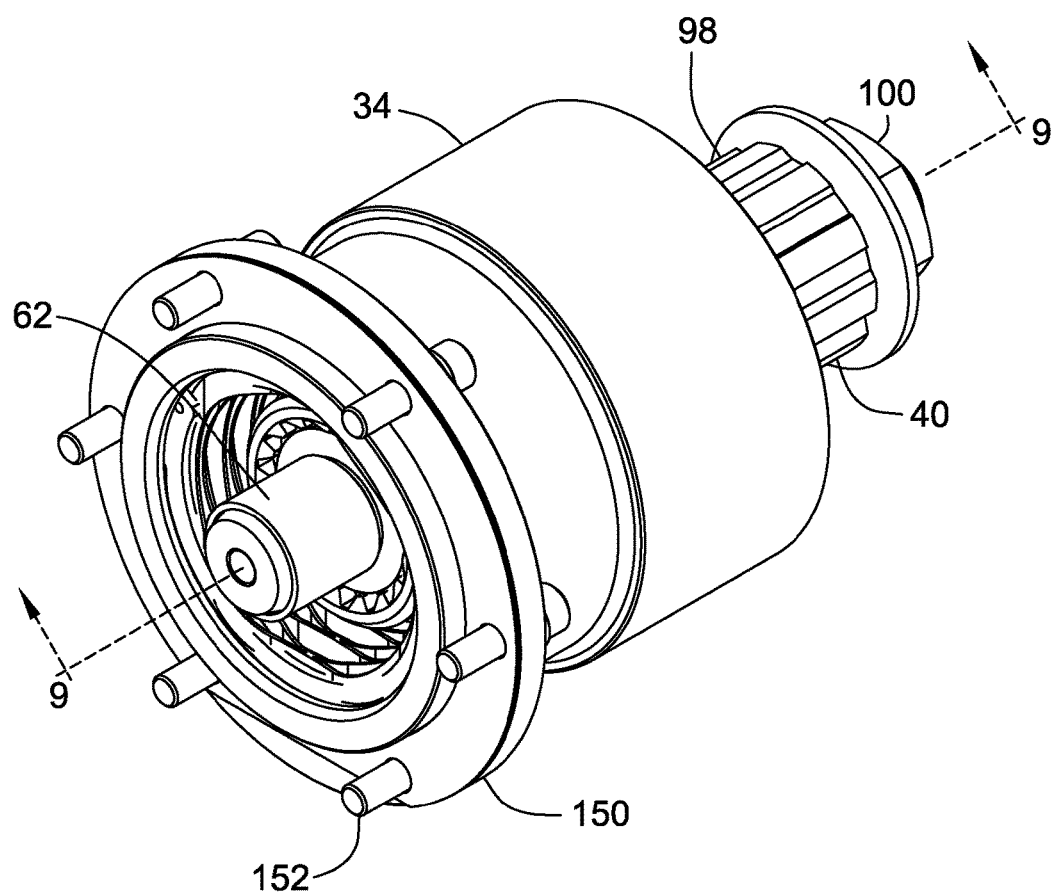
FIG. 8 is a perspective view of the coupling assembly of FIG. 5 for use in the pump assembly of FIG. 1.

Referring now to FIGS. 8-13, the drive coupling 22 is shown in greater detail. Referring now to FIG. 8, the drive coupling 22 may include a coupling mounting flange 150 for mounting the coupling 22 to drive housing 26 (see FIG. 5). The flange 150 may include mounting fasteners 152 for engagement with the housing 26.

Figure 9:
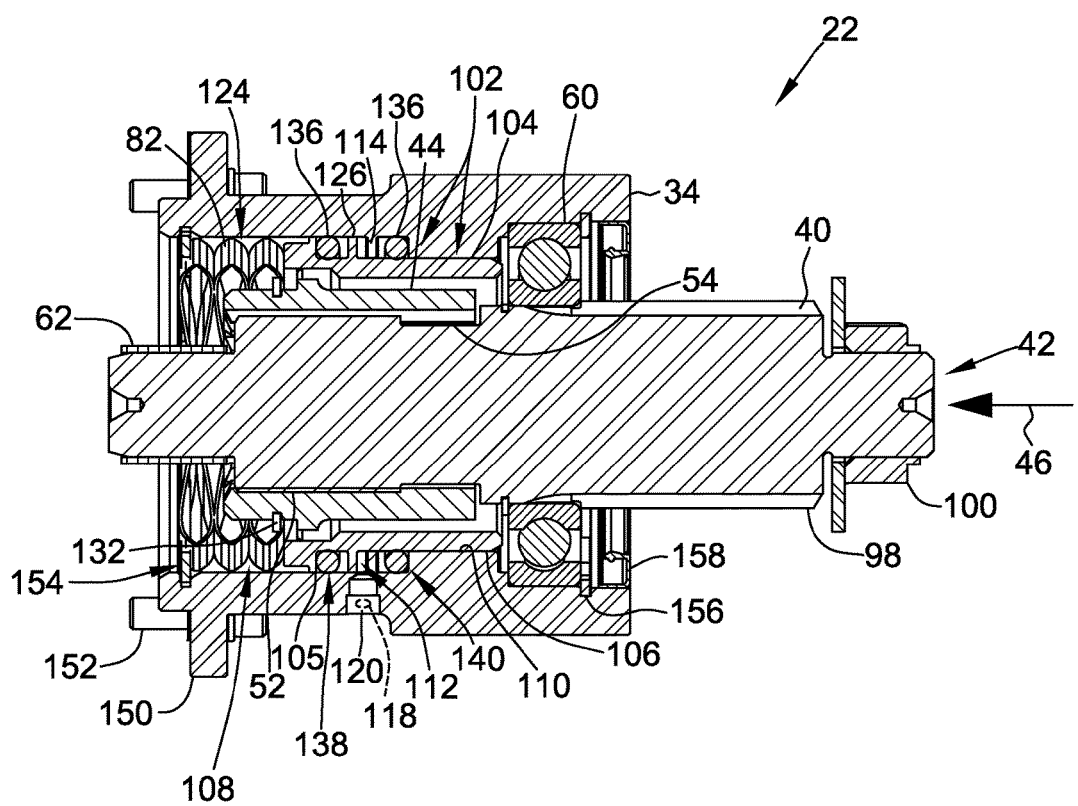
FIG. 9 is a cross sectional view of FIG. 8 along the line 9-9 in the direction of the arrows.

Referring now to FIG. 9, the drive coupling 22 may include a snap ring 154 mounted to drive coupling housing 34 for containing the spring 82. The drive coupling 22 may further include a snap ring 156 mounting to drive coupling housing 34 for containing the bearing 60. The drive coupling 22 may further include a seal 158 mounting to drive coupling housing 34 for sealing the bearing 60.

Figure 10:
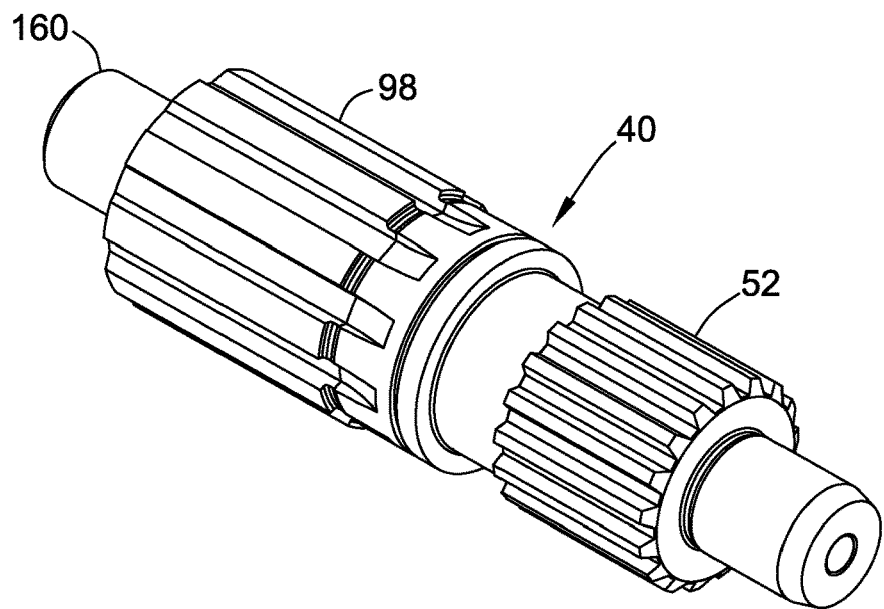
FIG. 10 is a perspective view of the disconnect shaft of the coupling assembly of FIG. 5 and FIG. 6.

Referring now to FIG. 10, the disconnect shaft 40 is shown in greater detail. The disconnect shaft 40 may further include threads 160 for securing nut 100 (see FIG. 8).

Figure 11:
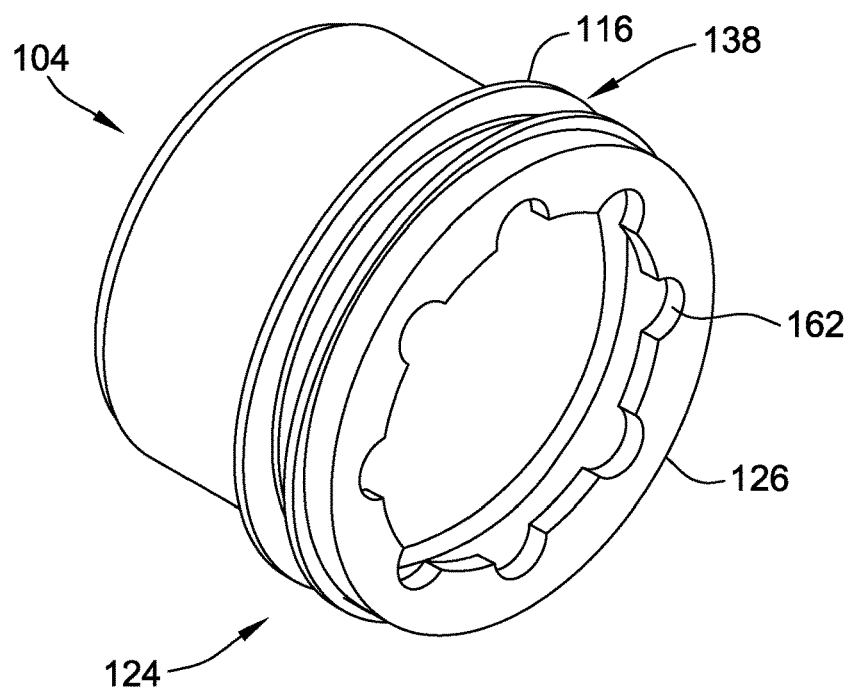
FIG. 11 is a perspective view of the shuttle of the coupling assembly of FIG. 5 and FIG. 6.

Referring now to FIG. 11, the shuttle 104 is shown in greater detail. The shuttle 104 may further include reliefs 162. The reliefs 162 allow oil to flow past the shuttle 104 and shift collar 44 to interface and lubricate the bearing 60 and exchange hot oil for cool oil in the drive 16.

Figure 12:
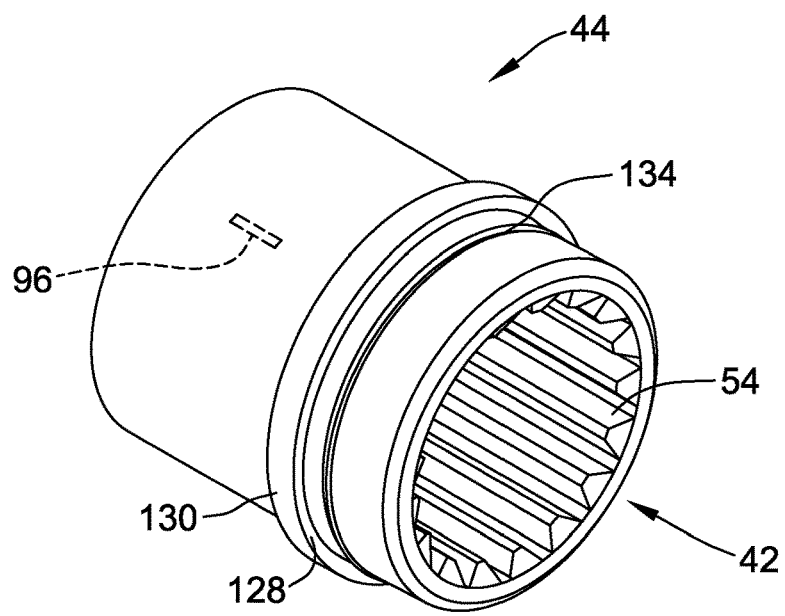
FIG. 12 is a perspective view of the shift collar of the coupling assembly of FIG. 5 and FIG. 6.

Referring now to FIG. 12, the shift collar 44 is shown in greater detail. The shift collar 44 as shown includes internal spline 54 for cooperation with disconnect shaft 40 (see FIG. 5) and internal spline 96 for cooperation with the output shaft 89 (see FIG. 5). It should be appreciated that for simplicity the internal splines 54 and 96 may have the same dimensions and may extend continuously along passage 42 of the collar 44.

Figure 13:
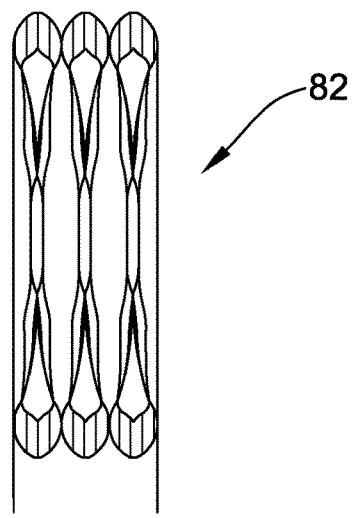
FIG. 13 is a plan view of the wave spring of the coupling assembly of FIG. 5 and FIG. 6.

Referring now to FIG. 13, the spring 82 is shown in greater detail.

Figure 14:
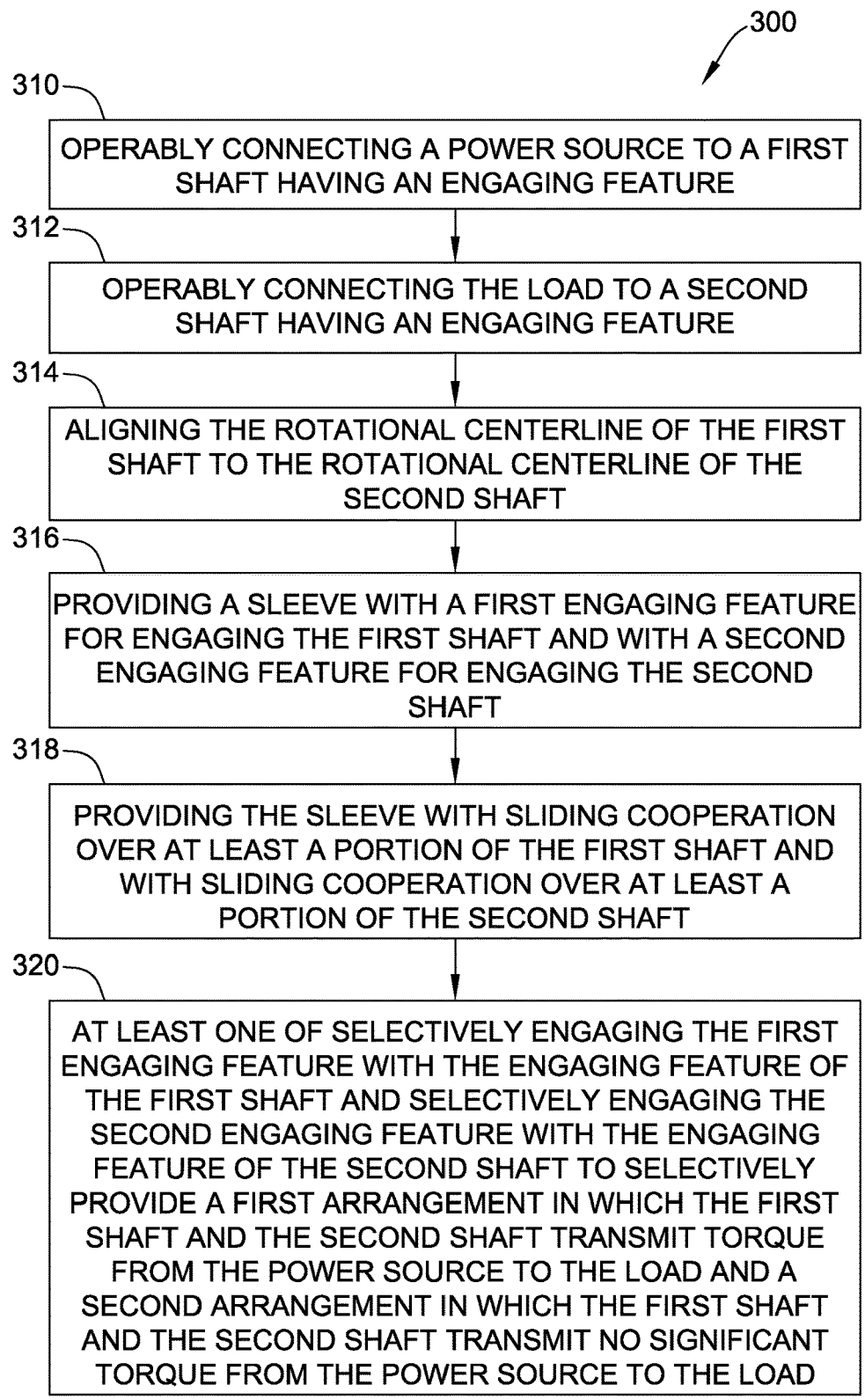
FIG. 14 is a schematic flow chart of a method for providing a dis-connectable coupling for a drive according to another embodiment of the invention.

Referring now to FIG. 14 and according to another embodiment of the invention, a method 300 for selective engaging and disengaging a pump from a power source is provided. The method includes step 310 of operably connecting a power source to a first shaft having an engaging feature, step 312 of operably connecting the pump to a second shaft having an engaging feature, step 314 of aligning the rotational centerline of the first shaft to the rotational centerline of the second shaft, step 316 of providing a sleeve with a first engaging feature for engaging the first shaft and with a second engaging feature for engaging the second shaft, step 318 of providing the sleeve with sliding cooperation over at least a portion of the first shaft and with sliding cooperation over at least a portion of the second shaft, and step 320 of at least one of selectively engaging the first engaging feature with the engaging feature of the first shaft and selectively engaging the second engaging feature with the engaging feature of the second shaft to selectively provide a first arrangement in which the first shaft and the second shaft transmit torque from the power source to the load and a second arrangement in which the first shaft and the second shaft transmit no significant torque from the power source to the load.

The methods, systems, and apparatus described herein facilitate efficient and economical operation, manufacture and assembly of a mechanical device. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing lower cost materials in a permanent magnet machine that reduces or eliminates the efficiency loss caused by the lower cost material. Furthermore, the exemplary methods system and apparatus achieve increased efficiency while reducing or eliminating an increase of the length of the machine. The methods, system and apparatus described herein may be used in any suitable application. However, they are particularly suited for a coupling for a mechanical drive to drive or transmit torque to mechanical components.

Exemplary embodiments of the fluid flow device and system are described above in detail. The mechanical drive and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A drive coupling connected to a drive for removably coupling a load to a power source, the drive coupling comprising:
    a body;
    a first component having a first component centerline of rotation and being connected to the power source through an external spline on said first component, said first component defining a bore formed in said first component;
    a second component having a second component centerline and being connected to the load, said second component having an end thereof, the end of said second component being fitted into the bore, the end of said second component being supported by said first component;
    a third component having a third component centerline of rotation, said third component having a central passage, said first component having an integral engagement feature that engages the third component, said second component having an integral engagement feature that engages the third component, said first, second and third components defining a first arrangement in which said first, second and third components transmit torque from the power source to the load and a second arrangement in which said first, second and third components transmits no significant torque from the power source to the load, said third component translating along its centerline of rotation relative to the first and the second components from a first position in which said plurality of components define the first arrangement to a second position in which said plurality of components define the second arrangement, said third component engages the first component only in the first arrangement;
    a piston having a piston centerline of rotation for urging the third component into the first arrangement; and
    a spring having a spring centerline of rotation for urging the third component into the second arrangement, the first component centerline, the second component centerline, the third component centerline, the piston centerline and the spring centerline being collinear with each other.

2. The drive coupling in accordance with claim 1:
    wherein said third component defines protrusions on a periphery thereof; and
    wherein the integral engagement feature of at least one of said first and second components defines protrusions on a periphery thereof, the protrusions of said third component and the protrusions of at least one of said first and second components selectively engage and disengage with each other as said third component translates along its center of rotation.

3. The drive coupling in accordance with claim 1, wherein one of said first and second components further defines a journal positioned at a first end thereof, said journal defining a hearing surface receiving the other said first and second components and for cooperating with said drive.

4. The drive coupling in accordance with claim 1, wherein said piston comprises a fluid actuated piston.

5. The drive coupling in accordance with claim 1:
    wherein said first component comprises a shaft defining a cylindrical cavity extending from a first end thereof; and further comprising a bearing positioned in the cavity and defining a bearing surface.

6. The drive coupling in accordance with claim 5, wherein the bearing is a journal bearing.

7. The drive coupling in accordance with claim 6, wherein the bearing surface comprises polytetrafluoroethylene.

8. The drive coupling in accordance with claim 1, wherein the third component comprises a collar.

9. The drive coupling in accordance with claim 1, wherein the second component is supported by the third component and by a solitary bearing.

10. A method for selective engaging and disengaging a pump from a power source comprising the steps of:
   operably connecting a power source to a first shaft, by an external spline on the shaft, the first shaft having a first shaft rotational centerline and having an integral engaging feature, the first shaft defining a bore formed in the first shaft;
   operably connecting the pump to a second shaft having a second shaft rotational centerline and having an integral engaging feature, the second shaft having an end thereof, the end of the second shaft being fitted into the bore, the end of the second shaft being supported by the first shaft;
   aligning the rotational centerline of the first shaft to the rotational centerline of the second shaft;
   providing a collar having a collar rotational centerline with a first engaging feature for engaging the integral engaging feature of the first shaft and with a second engaging feature for engaging the integral engaging feature of the second shaft, the collar having a central passage;
   providing the collar with sliding cooperation over at least a portion of the first shaft and with sliding cooperation over at least a portion of the second shaft;
   at least one of selectively engaging the first engaging feature of the collar with the engaging feature of the first shaft and selectively engaging the second engaging feature of the collar with the engaging feature of the second shaft to selectively provide a first arrangement in which the first shaft and the second shaft transmit torque from the power source to the pump and a second arrangement in which the first shaft and the second shaft transmit no significant torque from the power source to the pump, said collar engages the first shaft only in the first arrangement;
   providing a piston having a piston rotational centerline for urging the collar into the first arrangement; and
   providing a spring having a spring rotational centerline for urging the collar into the second arrangement, the first shaft rotational centerline, the second shaft rotational centerline, the collar rotational centerline, the piston rotational centerline and the spring rotational centerline being collinear with each other.

11. A drive coupling connected to a drive and adapted to removably couple a load to a power source, the drive coupling comprising:
   a body;
   an input shaft having an input shaft centerline of rotation and being connected to the power source through an integral external spline on said input shaft, the input shaft defining a bore formed in the input shaft;
   an output shaft having an output shaft centerline and being connected to the load, the output shaft having an end thereof, the end of the output shaft being fitted into the bore, the end of the output shaft being supported by the input shaft;
   a collar having a collar centerline of rotation and first and second internal splines, the collar having a central passage, said input shaft having an external spline that engages the first internal spline of the collar, said output shaft having an integral external spline that engages the third component, said input shaft, said output shaft and said collar defining a first arrangement in which said input shaft, said output shaft and said collar transmit torque from the power source to the load and a second arrangement in which said input shaft, said output shaft and said collar transmit no significant torque from the power source to the load, said collar translating along its centerline of rotation relative to said input shaft and to said output shaft from a first position in which said input shaft, said output shaft and said collar define the first arrangement to a second position in which said input shaft, said output shaft and said collar define the second arrangement, said collar engages the input shaft only in the first arrangement;
   a piston having a piston centerline of rotation for urging said collar into the first arrangement; and
   a spring having a spring centerline of rotation for urging said collar into the second arrangement, the input shaft centerline, the output shaft centerline, the collar centerline, the piston centerline and the spring centerline being collinear with each other.

12. The drive coupling in accordance with claim 11:
   wherein said input shaft defines a cylindrical cavity extending from a first end thereof; and
   further comprising a bearing positioned in the cavity and defining the bearing surface.

13. The drive coupling in accordance with claim 12, wherein the bearing is a journal bearing.

14. The drive coupling in accordance with claim 12, wherein the bearing surface comprises polytetrafluoroethylene.

15. The drive coupling in accordance with claim 11, the first and second internal splines of said collar are integral with said collar.

16. The drive coupling in accordance with claim 11, wherein said output shaft is supported by said input shaft and by a solitary bearing mounted to said body.

* * * * *